United States Patent
Akalou et al.

(10) Patent No.: US 11,614,772 B2
(45) Date of Patent: Mar. 28, 2023

(54) ELECTRONIC DEVICE CASE AND PRIVACY DEVICE

(71) Applicant: ALCOVE GROUP, LLC, Houston, TX (US)

(72) Inventors: Yared Akalou, Houston, TX (US); Sergio Aleman, Jr., Tomball, TX (US)

(73) Assignee: ALCOVE GROUP, LLC, Houston, TX (US)

( * ) Notice: Subject to any disclaimer, the term of this patent is extended or adjusted under 35 U.S.C. 154(b) by 668 days.

(21) Appl. No.: 16/523,280

(22) Filed: Jul. 26, 2019

(65) Prior Publication Data

US 2020/0033918 A1 Jan. 30, 2020

Related U.S. Application Data

(60) Provisional application No. 62/711,228, filed on Jul. 27, 2018.

(51) Int. Cl.
*G06F 1/16* (2006.01)
*E05D 1/00* (2006.01)

(52) U.S. Cl.
CPC ............. *G06F 1/1603* (2013.01); *E05D 1/00* (2013.01)

(58) Field of Classification Search
CPC ..... G06F 1/1603; G06F 1/1628; G02B 27/04; H02J 7/025; H02J 50/10; A45C 2011/002; E05D 1/00
See application file for complete search history.

(56) References Cited

U.S. PATENT DOCUMENTS

| 5,400,903 | A | * | 3/1995 | Cooley | A45C 13/02 |
| | | | | | 206/320 |
| 6,772,883 | B2 | * | 8/2004 | Lindamood | A45F 3/04 |
| | | | | | 206/320 |
| 7,508,657 | B1 | * | 3/2009 | Smith | H04M 1/0279 |
| | | | | | 361/679.24 |
| 7,611,252 | B1 | * | 11/2009 | Lin | G06F 1/1603 |
| | | | | | 359/601 |
| 2004/0206645 | A1 | * | 10/2004 | Roubanis | A45C 11/24 |
| | | | | | 206/320 |
| 2013/0048514 | A1 | * | 2/2013 | Corcoran | A45C 11/00 |
| | | | | | 206/472 |
| 2014/0116632 | A1 | * | 5/2014 | Domash | A47C 7/72 |
| | | | | | 160/369 |
| 2017/0294935 | A1 | * | 10/2017 | Jacobs | H04M 1/185 |

FOREIGN PATENT DOCUMENTS

| DE | 102009056532 A1 | * | 6/2011 | ............. A45C 11/00 |
| GB | 2526421 A | * | 11/2015 | ............. A45C 11/00 |
| WO | WO-2016140534 A1 | * | 9/2016 | ............. A45C 11/00 |

* cited by examiner

*Primary Examiner* — Nidhi Thaker
(74) *Attorney, Agent, or Firm* — Ewing & Jones, PLLC

(57) ABSTRACT

A collapsible privacy shield may include a base panel and a top panel, the top panel coupled to the base panel by a pivot. The collapsible privacy shield may include a first side panel and a second side panel. Each side panel may be pivotably coupled to the base panel by a lower side panel pivot and to the top panel by an upper side panel pivot. Each side panel may include an upper section mechanically coupled to the top panel and a base section mechanically coupled to the base panel. The collapsible privacy shield may operate as a carrying case for an electronic device when in a collapsed position.

13 Claims, 10 Drawing Sheets

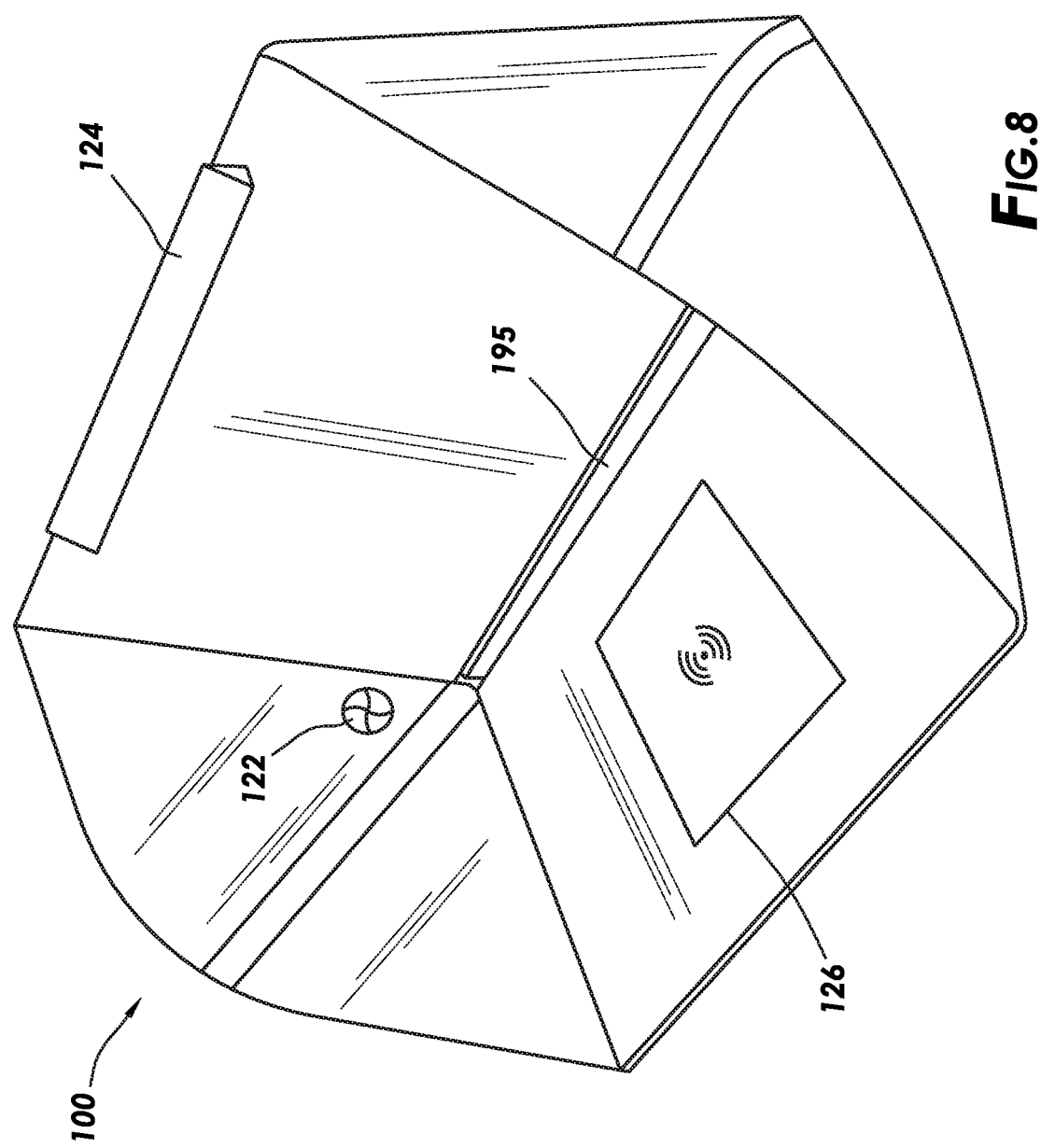

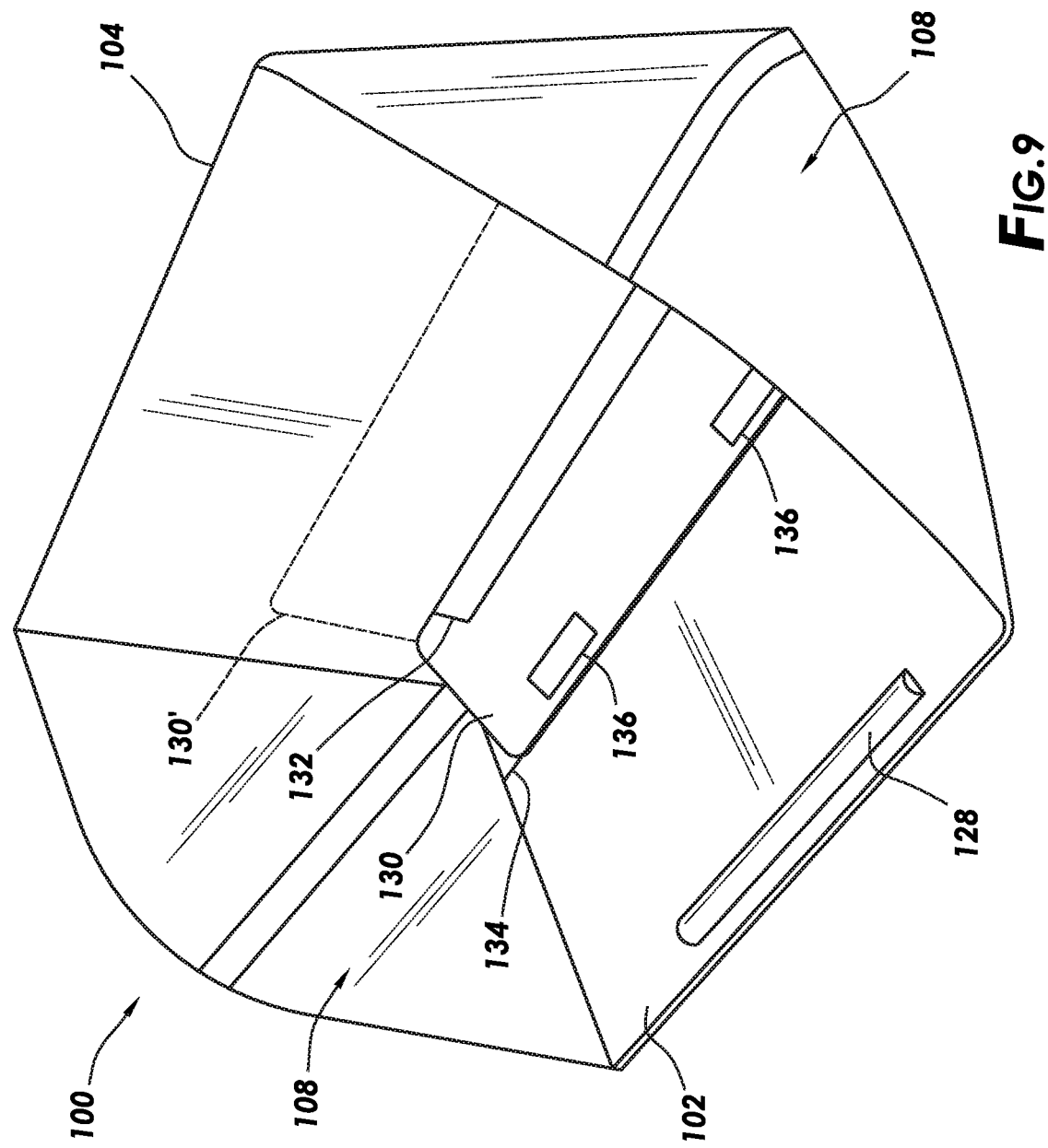

ELECTRONIC DEVICE CASE AND PRIVACY DEVICE

CROSS-REFERENCE TO RELATED APPLICATIONS

This application is a nonprovisional application which claims priority from U.S. provisional application No. 62/711,228, filed Jul. 27, 2018, which is incorporated by reference herein in its entirety.

TECHNICAL FIELD/FIELD OF THE DISCLOSURE

The present disclosure relates generally to a storage and privacy device for a mobile workstation, and more specifically to a laptop carrying and storage case that is usable to form an alcove to provide a user with privacy in an otherwise public workspace

BACKGROUND OF THE DISCLOSURE

Modern electronic devices such as laptop and notebook computers allow a user to work in virtually any locale. Wireless communication systems enable workers to send information from a notebook computer to the office and receive other information in return. As a result, most modern workspaces are configured as open spaces to facilitate collaboration as opposed to having workers in traditional offices or cubicles. Further, many people prefer to work on notebook computers while in public spaces, such as coffee shops, or even while waiting in the doctor's office.

Because many employers are sensitive that others may gain access to their employees' work product, these computers must be secure, both from electronic access and from visual access to the display by the surrounding public. Not only is work product at risk, but many electronic notebook users enter credit card numbers, passwords, health insurance information, and other private information into their computers.

In addition, due to the variety of locales in which a notebook computer may be used, the lighting in those locales may not always be the best lighting for viewing a computer screen.

SUMMARY

The present disclosure provides for a collapsible privacy shield. The collapsible privacy shield may include a base panel and a top panel, the top panel coupled to the base panel by a pivot. The collapsible privacy shield may include a first side panel and a second side panel. Each side panel may be pivotably coupled to the base panel by a lower side panel pivot and to the top panel by an upper side panel pivot. Each side panel may include an upper section mechanically coupled to the top panel and a base section mechanically coupled to the base panel.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 8 depicts a perspective view of a privacy shield consistent with at least one embodiment of the present disclosure.

FIG. 9 depicts a perspective view of a privacy shield consistent with at least one embodiment of the present disclosure.

DETAILED DESCRIPTION

Figure 1:
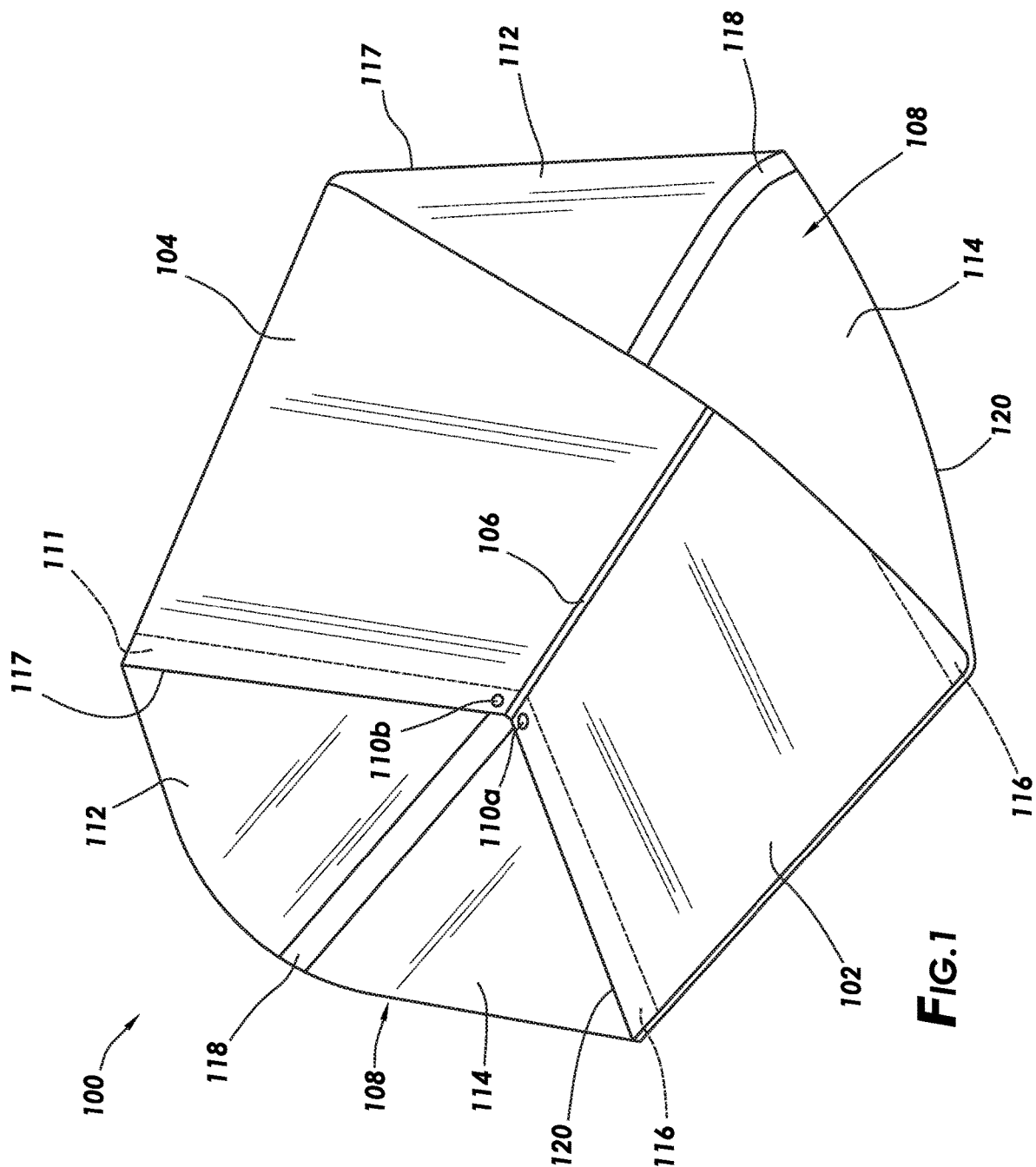
FIG. 1 depicts a perspective view of a privacy shield consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
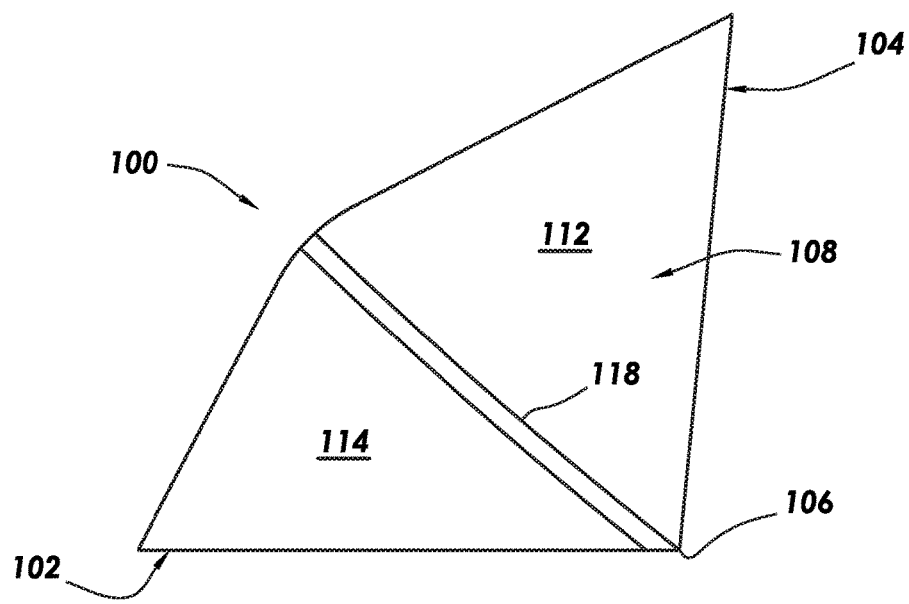
FIG. 2 depicts a side view of the privacy shield of FIG. 1.
Figure 3:
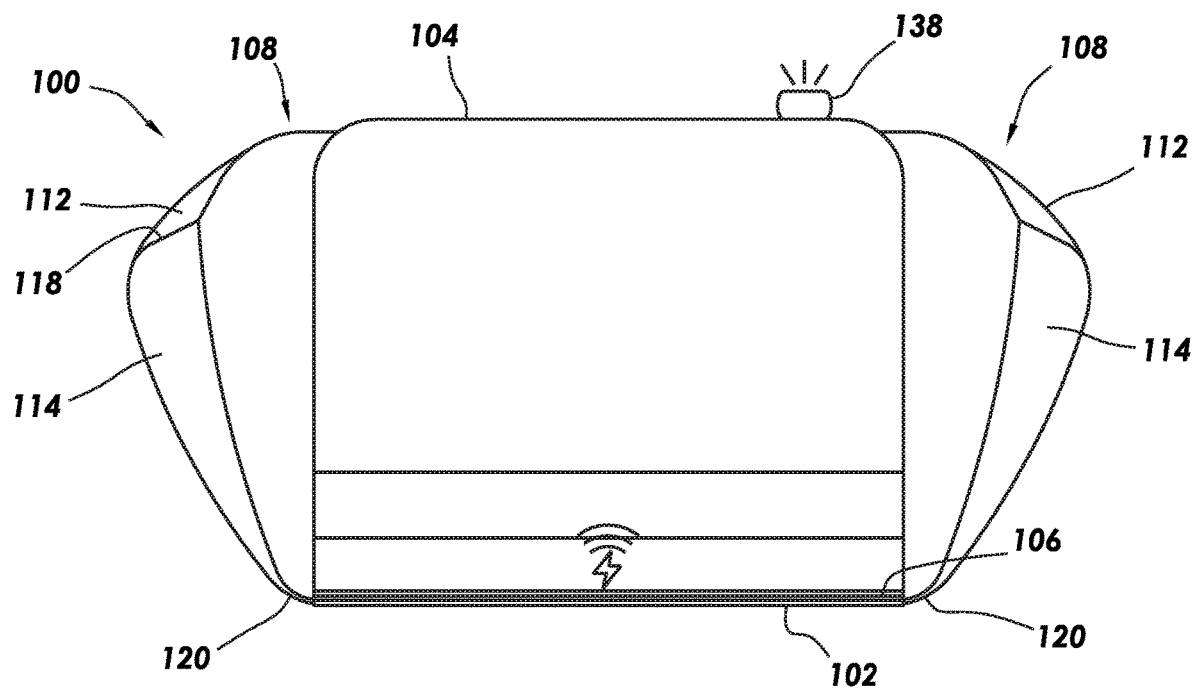
FIG. 3 depicts a front elevation view of a privacy shield consistent with at least one embodiment of the present disclosure.

FIGS. 1-3 depict privacy shield 100 consistent with at least one embodiment of the present disclosure. Privacy shield 100 may, in some embodiments, be used as a collapsible privacy shield and carrying case for an electronic device such as, for example and without limitation, a laptop computer, tablet, or any other similar electronic device.

In some embodiments, privacy shield 100 may include base panel 102 and top panel 104. Base panel 102 and top panel 104 may be mechanically coupled by pivot 106. Pivot 106 may be any structure suitable for allowing base panel 102 and top panel 104 to pivot or fold relative to each other as further described herein below. Pivot 106 may include, for example and without limitation, a single hinge; multiple hinges; a coupling formed from fabric, leather, or other pliable material; or any other suitable structure. In some embodiments, base panel 102 and top panel 104 may be formed as a single unit or assembly. In some embodiments, pivot 106 may be a flexible portion of base panel 102 and top panel 104. In some embodiments, base panel 102 and top panel 104 may be formed as single layers or from multiple layers as discussed further herein below. In some embodiments, pivot 106 may allow base panel 102 and top panel 104 to rotate relative to each other from approximately 0°, i.e. fully closed, to approximately 120° between a closed position and an open position of privacy shield 100. It is contemplated that the degree of rotation between the closed position and the open position of privacy shield 100 may be varied according to specific design considerations.

In some embodiments, privacy shield 100 may include side panels 108. Side panels 108 may, in some embodiments, mechanically couple to base panel 102, top panel 104, or both base panel 102 and top panel 104. In some embodiments, side panels 108 may mechanically couple to base panel 102 by lower side panel pivots 110a and may mechanically couple to top panel 104 by upper side panel pivots 110b. Side panel pivots 110a, 110b may be, for example and without limitation, rivets, threaded fasteners, grommets, or other suitable devices for mechanically coupling side panels 108 to base panel 102 and top panel 104 while allowing side panels 108 to pivot relative thereto between a retracted position and a deployed position as discussed further herein below.

Figure 1A:
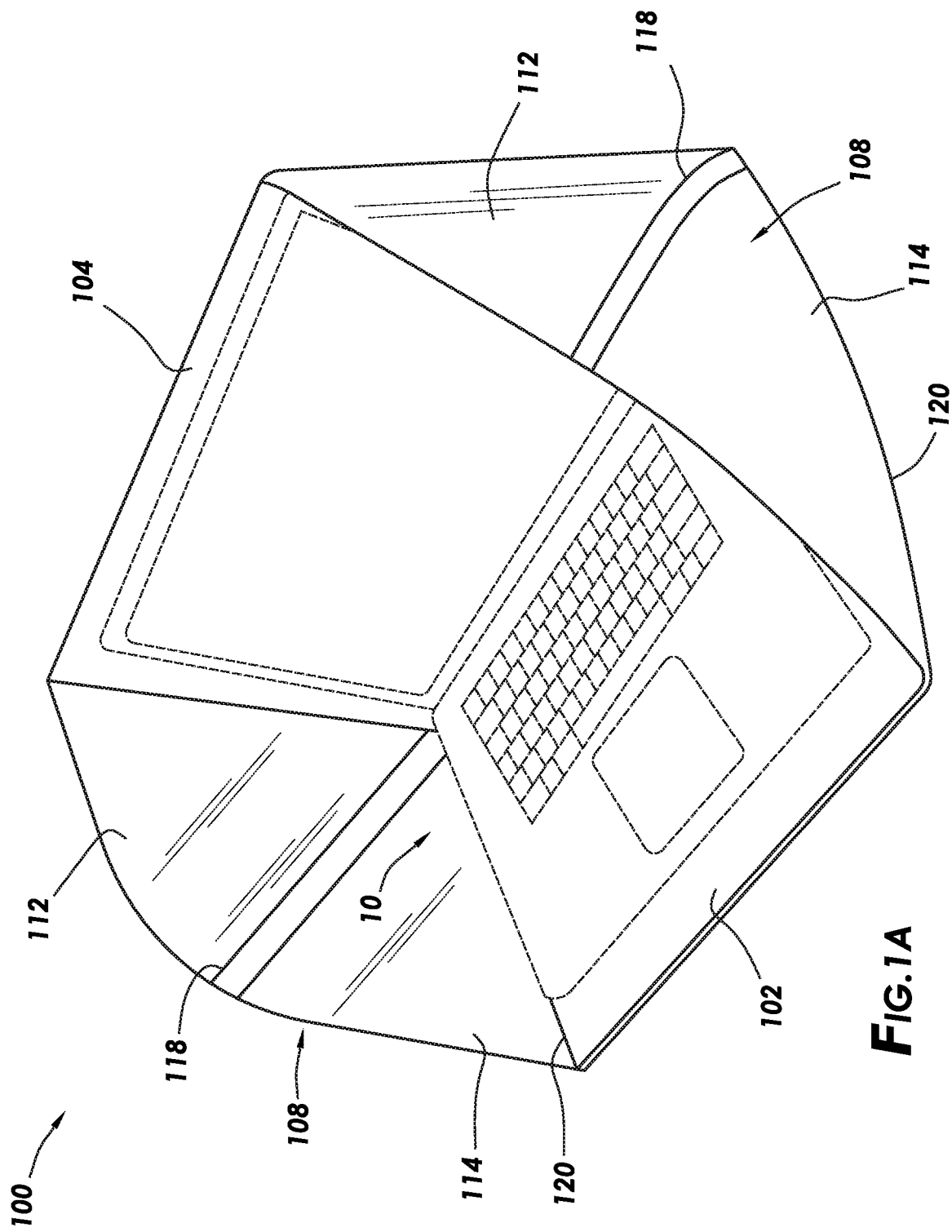
FIG. 1A depicts the privacy shield of FIG. 1 with a laptop computer positioned thereon consistent with at least one embodiment of the present disclosure.

As depicted in FIG. 1A, when in the open position, privacy shield 100 may be used to hold electronic device 10 during use while providing a user privacy from the surrounding environment. Top panel 104 and side panels 108 of privacy shield 100 may, in some embodiments, provide visual privacy and may provide acoustic isolation for the user of electronic device 10. It is contemplated that privacy shield 100, when in an open position, may be used with or without electronic device 10. The alcove formed by privacy shield 100 may, for example and without limitation, create an illusion of a private working space to both the user who is working on electronic device 10 positioned in the open privacy shield 100 and to co-workers or passers-by who are dissuaded from interrupting the user by the presence of the alcove defined by the open privacy shield 100.

In some embodiments, one or more of base panel 102, top panel 104, and side panels 108 may be formed at least partially from a sound-absorbing material such as, for example and without limitation, felt, open or closed cell foam, neoprene, or any other such material. In some embodiments, one or more of base panel 102, top panel 104, and side panels 108 may be covered with a material that may, without limitation, enhance usability, durability, or user comfort including, for example and without limitation, polyurethane, polyester, silicone, ballistic nylon, or leather.

Figure 1B:
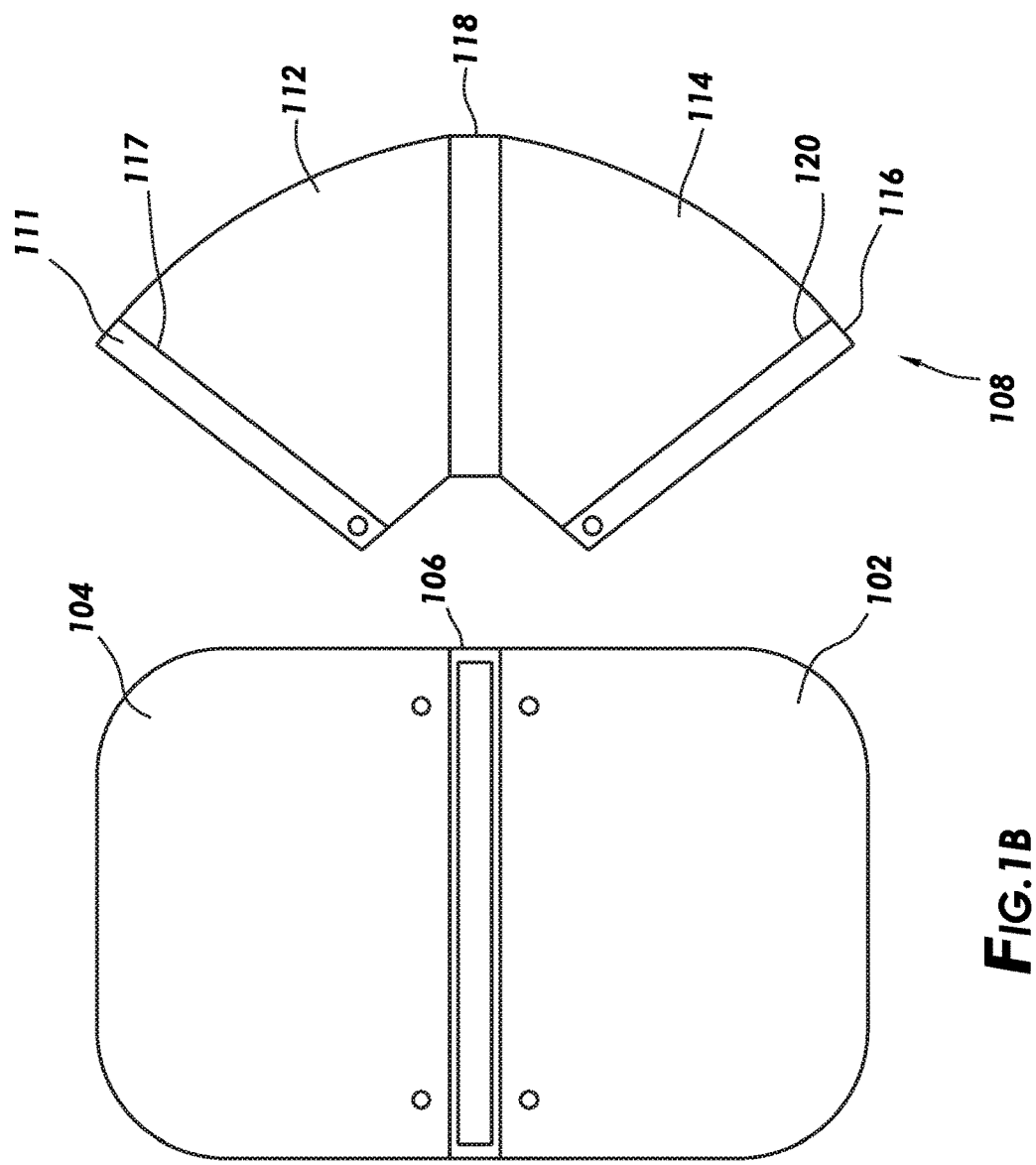
FIG. 1B depicts an exploded view of the privacy shield of FIG. 1.

In some embodiments, each side panel 108 may be formed from a single panel. In some embodiments, each side panel 108 may be formed from multiple sections. For example and without limitation, with respect to FIG. 1B, side panel 108 may include top section 111, upper section 112, lower section 114, and base section 116. Top section 111 may mechanically couple to top panel 104 of privacy shield 100 at upper side panel pivot 110b as shown in FIG. 1. Base section 116 may mechanically couple to base panel 102 of privacy shield 100 at lower side panel pivot 110a. Top section 111 may be flexibly coupled to upper section 112 at upper seam 117. Upper section 112 may be flexibly coupled to lower section 114 at middle seam 118. Lower section 114 may be flexibly coupled to base section 116 at lower seam 120. Upper seam 117, middle seam 118, and lower seam 120 may allow the adjacent sections of side panel 108 to pivot or fold relative to each other. Each of upper seam 117, middle seam 118, and lower seam 120 may include, for example and without limitation, a single hinge; multiple hinges; a coupling formed from fabric, leather, or other pliable material; or a flexible portion of side panel 108 designed to allow repeated folding between the adjacent sections of side panel 108. In some embodiments, one or more of upper seam 117, middle seam 118, or lower seam 120 may include a gusset.

In some embodiments, each side panel 108, including top section 111, upper section 112, lower section 114, and base section 116, is formed from a single material, wherein upper seam 117, middle seam 118, and lower seam 120 are thinner or otherwise mechanically weakened portions that allow side panel 108 to fold repeatedly therealong. In other embodiments, side panels 108 may be formed from multiple, separate portions. In such an embodiment, side panels 108 may include any number of sections that may form a sectioned rhombic so long as the rhombic is able to collapse into a flat profile when privacy shield 100 is closed.

In some embodiments, side panels 108 are formed from a material that is flexible but is stiff enough to maintain privacy shield 100 in the open position depicted in FIG. 1. In some embodiments, tension may be built into one or more of upper seam 117, middle seam 118, and lower seam 120 of side panels 108 such that side panels 108 open into a bow-shaped side wall and maintain privacy shield 100 in the open position. In some embodiments, upper seam 117 and lower seam 120 may be generally stiffer than middle seam 118 to, for example and without limitation, increase curvature or bowing of side panels 108 when privacy shield 100 is in the open position.

Figure 4:
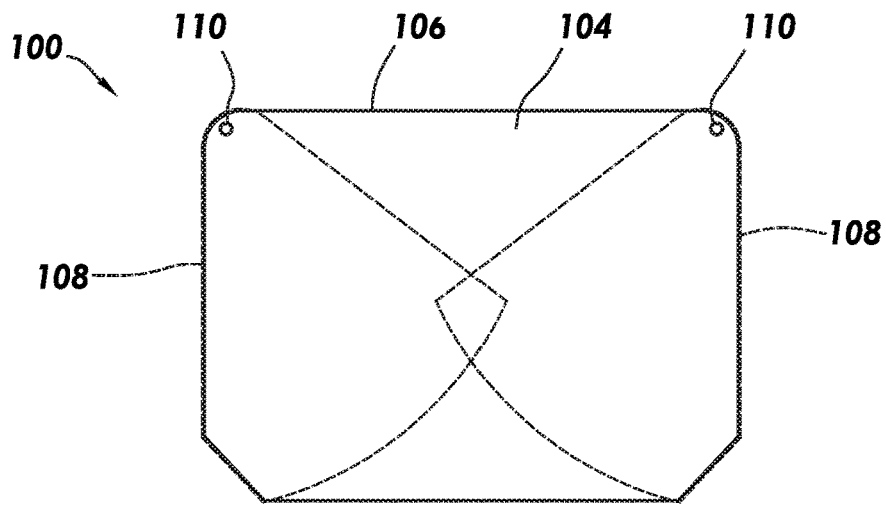
FIG. 4 depicts a top view of a privacy shield consistent with at least one embodiment of the present disclosure in a fully closed position.

In some embodiments, privacy shield 100 may be collapsible for transportation to be expanded when use is desired. In some such embodiments, with reference to FIGS. 4-6, privacy shield 100 may initially be positioned in the collapsed position depicted from the top in FIG. 4, from the side in FIG. 7, and in cross section in FIG. 7A. In such a position, top panel 104 may be folded to be approximately parallel to base panel 102 over pivot 106. Side panels 108 may be collapsed and pivoted inward on side panel pivots 110 such that side panels 108 are positioned within top panel 104 and base panel 102 as described further below.

Figure 7:
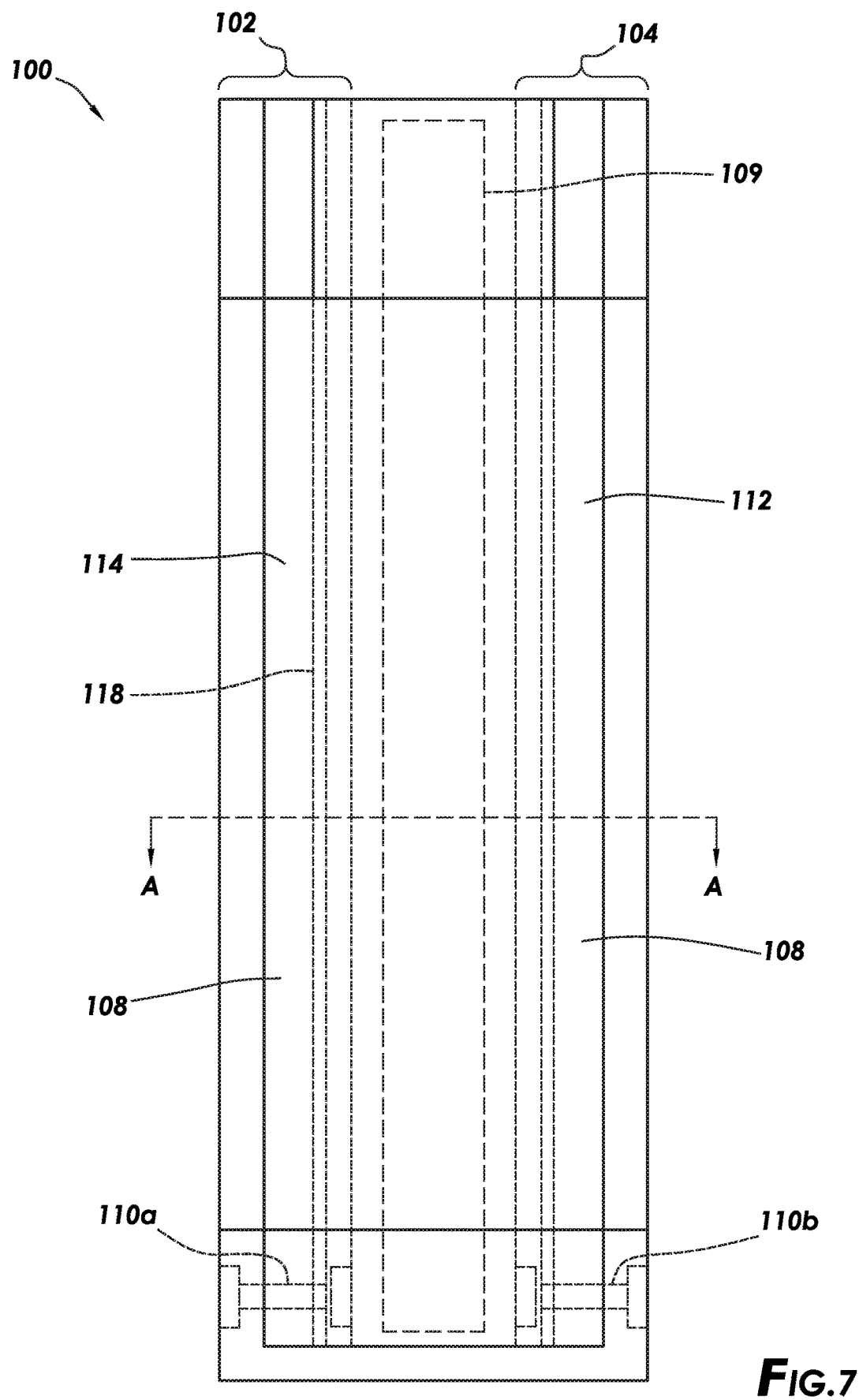
FIG. 7 depicts a side view of a privacy shield consistent with at least one embodiment of the present disclosure in the closed state.

In some embodiments, while in the collapsed position, privacy shield 100 may be used as a carrying case for electronic device 10 as shown in FIG. 7. In such an embodiment, electronic device 10 may be positioned in device carry compartment 109 defined between top panel 104 and base panel 102.

Figure 5:
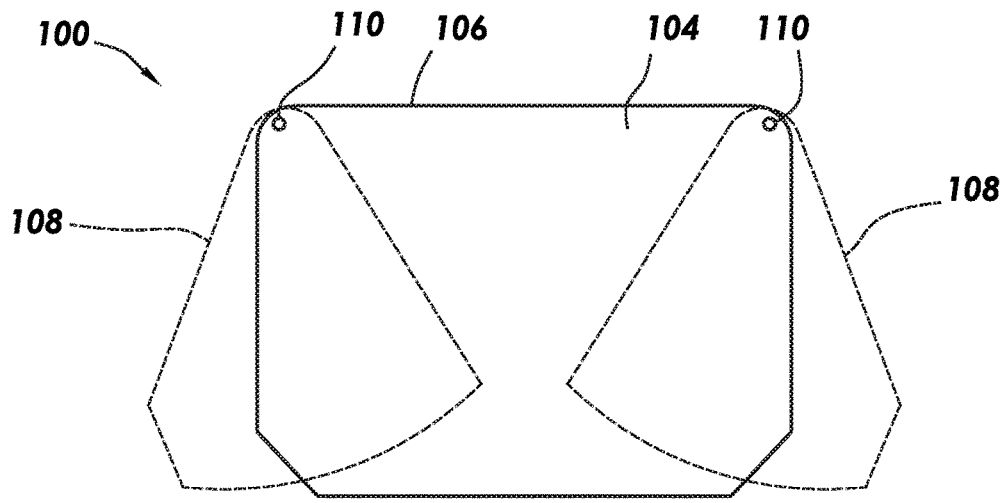
FIG. 5 depicts the privacy shield of FIG. 4 with side panels in a partially extended position.
Figure 6:
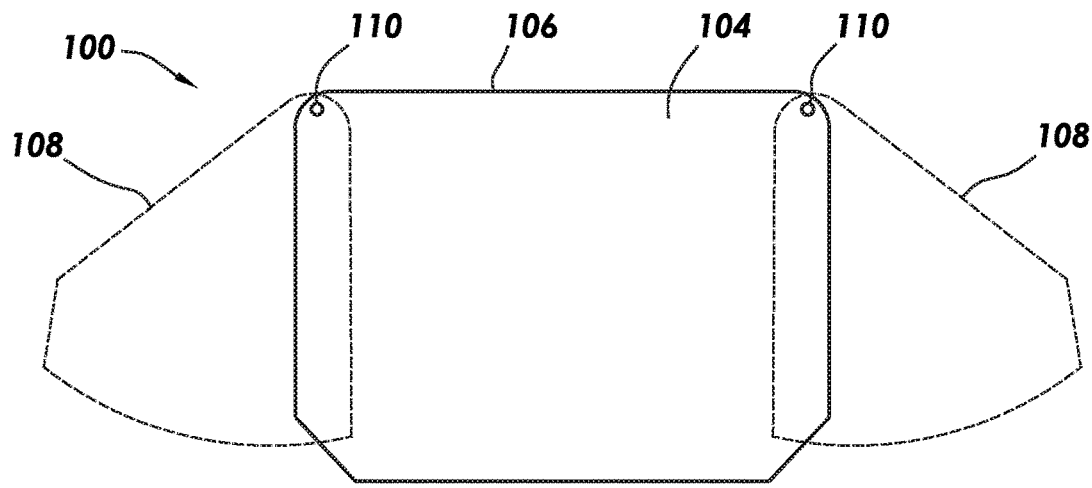
FIG. 6 depicts the privacy shield of FIG. 4 with side panels in a fully extended position.

When deployment of privacy shield 100 is desired, side panels may be pivoted outward from base panel 102 and top panel 104 along side panel pivots 110 as shown in FIG. 5 until fully extended as shown in FIG. 6. Top panel 104 may be pivoted upward from base panel 102 until at a desired angle from base panel 102 to the opened position as depicted in FIG. 1. As top panel 104 is pivoted upward, side panels 108 extend, unfolding at middle seam 118 such that upper section 112 and lower section 114 extend between top panel 104 and base panel 102. In some embodiments, tension within side panels 108 may cause side panels 108 to open into a bow-shaped side wall and may at least partially support top panel 104 in the open position.

Collapsing of privacy shield 100 may be accomplished by reversing the above-described operations. Top panel 104 may be pivoted downward to base panel 102 along pivot 106, causing side panels 108 to collapse along middle seam 118. Side panels 108 may then be pivoted inward into base panel 102 and top panel 104 along side panel pivots 110. In some embodiments, deployment and collapsing of privacy shield 100 may be accomplished without removing electronic device 10 or any other contents positioned within privacy shield 100.

Figure 7A:
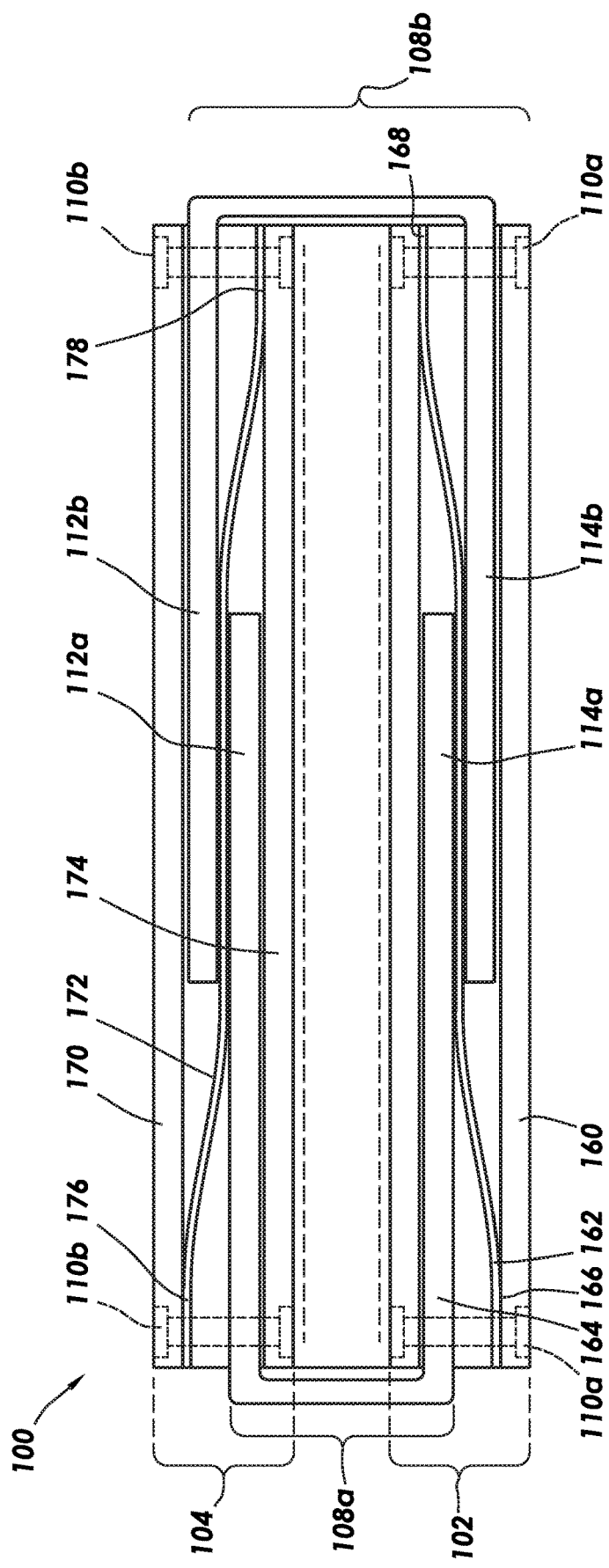
FIG. 7A depicts a cross section view of the privacy shield of FIG. 7 taken along line A-A.

As shown in FIG. 7A, base panel 102 and top panel 104 may be formed from multiple layers. For example and without limitation, in some embodiments, base panel 102 may be formed from base outer layer 160, base middle layer 162, and base inner layer 164. In some embodiments, base middle layer 162 may be coupled to base outer layer 160 at a first location, denoted attachment point 166, generally at a first side of privacy shield 100 and base middle layer 162 may be coupled to base inner layer 164 at a second location, denoted attachment point 168, generally at the other side of privacy shield 100, such that base middle layer 162 separates the space between base outer layer 160 and base inner layer 164 into two separate pockets, each open at a side of privacy shield 100.

In some such embodiments, top panel 104 may be formed from top outer layer 170, top middle layer 172, and top inner layer 174. In some embodiments, top middle layer 172 may be coupled to top outer layer 170 at a first location, denoted attachment point 176, generally at a first side of privacy shield 100 and top middle layer 172 may be coupled to top inner layer 174 at a second location, denoted attachment point 178, generally at the other side of privacy shield 100, such that top middle layer 172 separates the space between top outer layer 170 and top inner layer 174 into two separate pockets, each open at a side of privacy shield 100.

In such an embodiment, the pockets formed in each of base panel 102 and top panel 104 may receive a side panel, denoted left side panel 108a and right side panel 108b in FIG. 7A, positioned on the side to which the pockets are open. For example and without limitation, in some embodiments, lower section 114a of left side panel 108a may be separated from lower section 114b of right side panel 108b by base middle layer 162. Likewise, upper section 112a of left side panel 108a may be separated from upper section 112b of right side panel 108b by top middle layer 172. In such an embodiment, the separation of the portions of left side panel 108a and right side panel 108b by base middle layer 162 and top middle layer 172 may, for example and without limitation, allow left side panel 108a and right side panel 108b to be more easily collapsed by reducing or preventing interference between the sections of left side panel 108a and right side panel 108b.

In some embodiments, base middle layer 162 and top middle layer 172 may be formed from a material that has low friction against left side panel 108a and right side panel 108b such as, for example and without limitation, polyester.

In some embodiments, one or more of base outer layer 160, base inner layer 164, top outer layer 170, and top inner layer 174 may be formed from a single layer or may be formed from multiple layers. In some such embodiments, the layers may include, for example and without limitation, polyester, leather, Japanese board, fabric, ballistic nylon, or any other materials.

In some embodiments, as depicted in FIG. 8, privacy shield 100 may include one or more apertures 122. Apertures 122 may be formed in one or more of base panel 102, top panel 104, or side panels 108. Apertures 122 may be positioned to, for example and without limitation, allow for one or more electrical cables, security cables, or other such devices to pass through privacy shield 100. For example and without limitation, power or data cords may pass from an external power adapter or computer peripheral to a device positioned within privacy shield 100 during use. In some embodiments, apertures 122 may allow for air circulation to, for example and without limitation, prevent overheating of any devices used within privacy shield 100. In some embodiments, apertures 122 may include grommets positioned to, for example and without limitation, close apertures 122 around a cable passing therethrough or close apertures 122 when no cable passes therethrough.

In some embodiments, privacy shield 100 may include light emitting device 124. Light emitting device 124 may be positioned on, for example and without limitation, base panel 102, top panel 104, or side panels 108. Light emitting device 124 may, for example and without limitation, be used to provide additional illumination to a user when privacy shield 100 is in use as shown in FIG. 8. In some embodiments, one or more controllers or switches may be provided on privacy shield 100 to control light emitting device 124. In some embodiments, light emitting device 124 may be controlled by a simple on/off switch or may be dimmable according to the needs of the user and/or according to the ambient conditions. In some embodiments, light emitting device 124 may be rechargeable. In some such embodiments, light emitting device 124 may be used as a battery to charge an electronic device used in privacy shield 100. In some embodiments, a visor may be attachable to top panel 104.

In some embodiments, privacy shield 100 may include wireless charging system 126. Wireless charging system 126 may be used to provide power to one or more devices positioned within privacy shield 100. In some embodiments, for example and without limitation, privacy shield 100 may be coupled to a power supply to provide power for wireless charging system 126. In such an embodiment, a device, such as a wireless phone, tablet, laptop, e-reader, or other device having wireless charging capabilities, may be powered by wireless charging system 126 while used within privacy shield 100.

In some embodiments, privacy shield 100 may include one or more pads to cushion a device positioned within privacy shield 100 when in the collapsed position. For example, as depicted in FIG. 8, privacy shield 100 may include spine pad 195. Spine pad 195 may, for example and without limitation, provide impact protection for a device positioned within privacy shield 100.

In some embodiments, privacy shield 100 may include one or more internal supports to, for example and without limitation, aide a user while using a device within privacy shield 100. For example, in some embodiments as depicted in FIG. 9, privacy shield 100 may include device retention bumper 128. Device retention bumper 128 may be positioned on base panel 102 or may be formed integrally therewith. Device retention bumper 128 may be a raised portion that extends above the surface of base panel 102 to, for example and without limitation, provide a barrier or detent for a device used within privacy shield 100. For example, device retention bumper 128 may be used to retain a laptop or other device within privacy shield 100 and prevent or reduce the likelihood that the device will slide out of privacy shield 100 during use.

In some embodiments, privacy shield 100 may include device support platform 130. Device support platform 130 may be positioned to at least partially support or otherwise determine the positioning of a device being used within privacy shield 100. In some embodiments, for example and without limitation, device support platform 130 may allow a user to position the device at an angle above the plane of base panel 102. In such an embodiment, device support platform 130 may extend between base panel 102 and top panel 104. In some embodiments, device support platform 130 may pivotably couple to top panel 104. In some embodiments, device support platform 130 may be moved between a deployed position and a retracted position, depicted as device support platform 130'. In some embodiments, device support platform 130 may be removably coupled to top panel 104 by fastener 132. Fastener 132 may include one or more of a hook-and-loop connection, push or snap couplers, magnets, or any other suitable couplers. In some embodiments, device support platform 130' may be retained in the retracted position by one or more fasteners such as, for example and without limitation, a hook-and-loop connection, push or snap couplers, magnets, or any other suitable couplers positioned between device support platform 130' and top panel 104.

In some embodiments, device support platform 130 may engage with edge 134 positioned on base panel 102 when in the deployed position. Edge 134 may be a seam, welt, slot, bumper, recess, slit, seam, welt, or other upset in base panel 102 against which device support platform 130 may seat such that device support platform 130 remains in the deployed position. Once deployed, the rear edge of a device may be placed upon device support platform 130 such that the device is angled relative to base panel 102. In some embodiments, device retention bumper 128 may assist in retaining the device within privacy shield 100 when device support platform 130 is utilized. In some embodiments, device support platform 130 may include one or more bumps or detents 136 to further reduce or prevent movement of the device when device support platform 130 is utilized. In some embodiments, device support platform 130 may operate to hold privacy shield 100 in an open position.

In some embodiments, as depicted in FIG. 3, privacy shield 100 may include do not disturb indicator 138 on an external face of privacy shield 100, such as on top panel 104 or side panels 108. In some embodiments, do not disturb indicator 138 may include, for example and without limitation, a red light emitting diode that illuminates a "BUSY" or "DO NOT DISTURB" sign as an indication that the user would prefer not to be disturbed while indicator 138 is illuminated.

Figure 10:
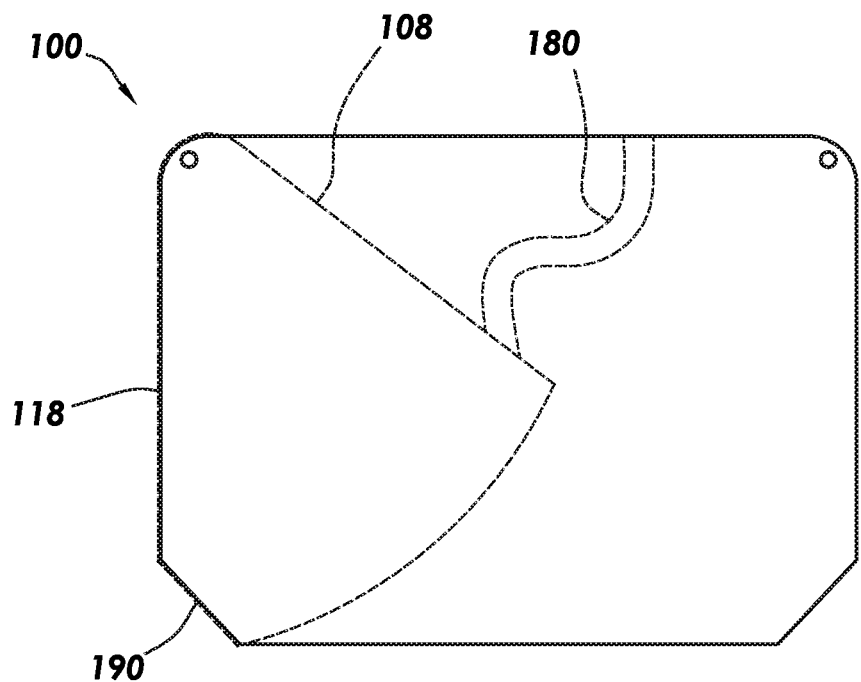
FIGS. 10, 10A depict partially transparent views of a privacy shield consistent with at least one embodiment of the present disclosure.
Figure 10A:
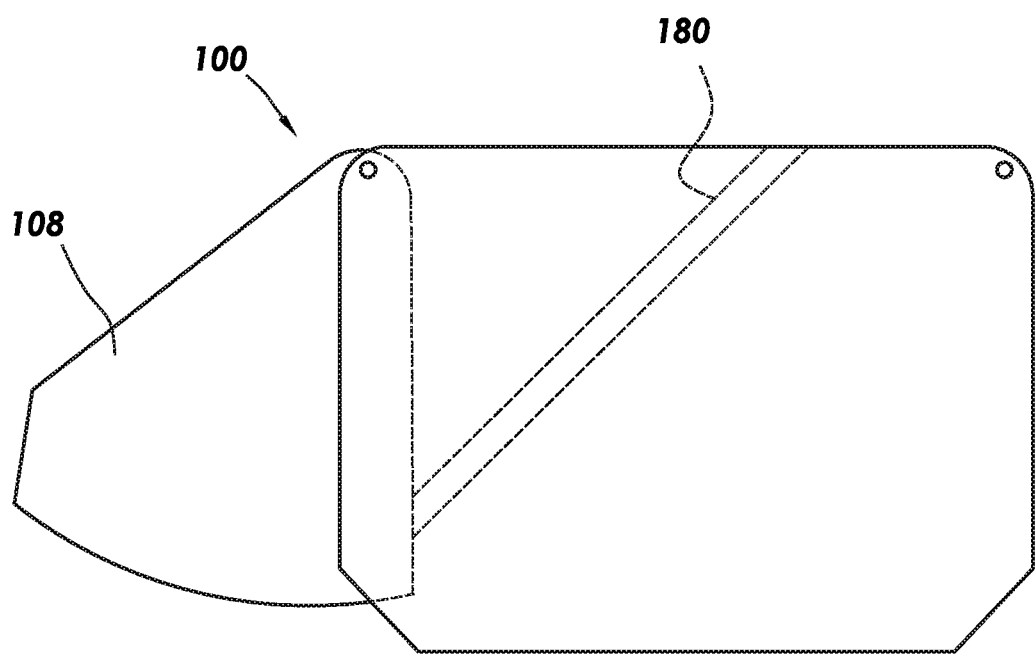

In some embodiments, as depicted in FIGS. 10, 10A, privacy shield 100 may include one or more side panel retainers 180. Side panel retainers 180 may, for example and without limitation, operate to prevent overextension of side panels 108 during a deployment of privacy shield 100. In some such embodiments, side panel retainers 180 may be a flexible material such as a ribbon, string, elastic band, or other component that may couple between one or more sections of side panel 108 and one or more of base panel 102 and top panel 104. For example, in some embodiments, side panel retainers 180 may couple between both base section 116 and pivot 106 and top section 111 and pivot 106. In such an embodiment, side panel retainers 180 may collapse within base panel 102 or top panel 104 when side panel 108 is in the collapsed position depicted in FIG. 10. As side panel 108 reaches full extension as depicted in FIG. 10A, side panel retainers 180 may be extended and prevent or reduce further movement of side panel 108.

In some embodiments, side panel retainers may be one or more slots or depressions in side panels 108 into which one or more pins coupled to one or more of base panel 102 and top panel 104 are received.

In some embodiments, middle seam 118 may include an angled or curved portion, depicted as angled portion 190 in FIG. 10. In some embodiments, angled portion 190 may, for example and without limitation, reduce the size of the opening defined by base panel 102, top panel 104, and side panels 108 such that a device positioned within privacy shield 100 is retained within privacy shield 100.

In some embodiments, one or both side panels 108 may be at least partially collapsed to, for example and without limitation, partially open privacy shield 100. In some embodiments, one or more retainers may be used to maintain privacy shield 100 in the partially open position.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A collapsible privacy shield comprising:
 a base panel, wherein the base panel is formed from a base outer layer, a base middle layer and a base inner layer and wherein the base middle layer is coupled to the base outer layer at a first attachment point and the base middle layer is coupled to the base inner layer at a second attachment point, such that the base middle layer separates a space between the base outer layer and the base inner layer into two separate base pockets, each open at a side of the collapsible privacy shield;
 a top panel, the top panel coupled to the base panel by a pivot, wherein the top panel is formed from a top outer layer, a top middle layer, and a top inner layer and wherein top middle layer is coupled to the top outer layer at a third attachment point and the top middle layer is coupled to the top inner layer at a fourth attachment point such that the top middle layer separates the space between the top outer layer and the top inner layers into two separate top pockets; and
 a first side panel and a second side panel, each side panel pivotably coupled to the base panel by a lower side panel pivot and to the top panel by an upper side panel pivot, each side panel having:
  a top section, the top section coupled to the top panel at an upper side panel pivot point;
  an upper section, the upper section flexibly coupled to the top section at an upper seam;
  a lower section the lower section flexibly coupled to the upper section at a middle seam;
  a base section, the base section flexibly coupled to the lower section at a lower seam, and wherein the base section is mechanically coupled to the base panel;
  wherein each of the upper seam, the middle seam, and the lower seam include a single hinge, multiple hinges, or a coupling formed from fabric or leather;
 at least one close aperture configured on one of the first side panel and the second side panel configured to allow at least one cable through the aperture; and
 a device support platform with detents, the device support platform extending between the base panel and the top panel, the device support platform positioned to at least partially support a device positioned within the collapsible privacy shield.

2. The collapsible privacy shield of claim 1, further comprising a do not disturb indicator, the do not disturb indicator including a light emitting diode, the do not disturb indicator positioned on the top panel, the first side panel, or the second side panel.

3. The collapsible privacy shield of claim 1, further comprising a device retention bumper, the device retention bumper being a raised portion of base panel and positioned to provide a barrier or detent for a device positioned within the collapsible privacy shield.

4. The collapsible privacy shield of claim 1, further comprising a side panel retainer, the side panel retainer adapted to prevent overextension of the side panels relative to the base panel and top panel.

5. The collapsible privacy shield of claim 1, further comprising a wireless charging system positioned in the base panel.

6. The collapsible privacy shield of claim 1, wherein the first and second side panels are pivotable into a space between the base panel and the top panel when the base panel and top panel are closed along the pivot.

7. The collapsible privacy shield of claim 6, wherein the upper seam, the lower seam, or the upper and the lower seam are formed such that tension is built in such that the first and second side panels at least partially maintain an angle between the base panel and the top panel when the collapsible privacy shield is in an open position.

8. The collapsible privacy shield of claim 1, wherein a space defined between the top panel and the first and second side panels or between the base panel and the first and second side panels defines a device-carry compartment.

9. The collapsible privacy shield of claim 1, wherein each side panel pivot is a rivet or threaded fastener.

10. The collapsible privacy shield of claim 1, wherein the pivot is a single hinge; multiple hinges; a coupling formed from fabric, leather, or other pliable material.

11. The collapsible privacy shield of claim 1, wherein the base panel, top panel, first side panel, or second side panel is formed from a sound-absorbent material.

12. The collapsible privacy shield of claim 1, wherein one or more of the upper seam, the middle seam, or the lower seam includes a gusset.

13. The collapsible privacy shield of claim 1, wherein the upper seam, the middle seam, and the lower seam are thinner than the top section, upper section, lower section, and base section.

* * * * *